United States Patent
Seregin et al.

(10) Patent No.: US 10,194,146 B2
(45) Date of Patent: Jan. 29, 2019

(54) DEVICE AND METHOD FOR SCALABLE CODING OF VIDEO INFORMATION

(71) Applicant: QUALCOMM Incorporated, San Diego, CA (US)

(72) Inventors: Vadim Seregin, San Diego, CA (US); Ying Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 199 days.

(21) Appl. No.: 14/222,459

(22) Filed: Mar. 21, 2014

(65) Prior Publication Data

US 2014/0294097 A1 Oct. 2, 2014

Related U.S. Application Data

(60) Provisional application No. 61/805,489, filed on Mar. 26, 2013, provisional application No. 61/921,989, filed on Dec. 30, 2013.

(51) Int. Cl.
*H04N 19/31* (2014.01)
*H04N 19/58* (2014.01)
(Continued)

(52) U.S. Cl.
CPC .......... *H04N 19/105* (2014.11); *H04N 19/31* (2014.11); *H04N 19/58* (2014.11); *H04N 19/187* (2014.11); *H04N 19/597* (2014.11); *H04N 19/70* (2014.11)

(58) Field of Classification Search
USPC ............................................ 375/240, 240.26
See application file for complete search history.

(56) References Cited

U.S. PATENT DOCUMENTS

| | | |
|---|---|---|
| 2007/0086521 A1 | 4/2007 | Wang et al. |
| 2013/0208792 A1 | 8/2013 | He et al. |

(Continued)

FOREIGN PATENT DOCUMENTS

| | | |
|---|---|---|
| WO | WO-2008071037 A1 | 6/2008 |
| WO | WO-2008084443 A1 | 7/2008 |

OTHER PUBLICATIONS

Hannuksela Met al ."Test Model for Scalable Extensions of High Efficiency Video Coding (HEVC)",103. MPEG Meeting; Jan. 21, 2013-Jan. 25, 2013; Geneva; (Motion Picture Expert Group or ISO/IEC JTC1/SC29/WG11),No. m28348, JCTVC-L0453, Jan. 22, 2013 (Jan. 22, 2013), XP030056894.*

(Continued)

*Primary Examiner* — Behrooz M Senfi
*Assistant Examiner* — Ana Picon-Feliciano
(74) *Attorney, Agent, or Firm* — Shumaker & Sieffert, P.A.

(57) ABSTRACT

An apparatus configured to code (e.g., encode or decode) video information includes a memory unit and a processor in communication with the memory unit. The memory unit is configured to store video information associated with a reference layer and an enhancement layer, the enhancement layer comprising an enhancement layer (EL) picture and the reference layer comprising a reference layer (RL) picture. The processor is configured to generate an inter-layer reference picture (ILRP) by resampling the RL picture; and determine whether, at a predetermined time, a reference picture of the ILRP was a short-term or long-term reference picture with respect to the ILRP. The processor may encode or decode the video information.

23 Claims, 7 Drawing Sheets

(51) Int. Cl.
*H04N 19/70* (2014.01)
*H04N 19/105* (2014.01)
*H04N 19/187* (2014.01)
*H04N 19/597* (2014.01)

(56) References Cited

U.S. PATENT DOCUMENTS

| | | | |
|---|---|---|---|
| 2013/0243081 A1 | 9/2013 | Chen et al. | |
| 2014/0003538 A1 | 1/2014 | Ramasubramonian et al. | |
| 2014/0064374 A1* | 3/2014 | Xiu | H04N 19/52 375/240.16 |
| 2014/0092964 A1* | 4/2014 | Ugur | H04N 19/46 375/240.12 |
| 2014/0205021 A1* | 7/2014 | Hannuksela | H04N 19/463 375/240.26 |
| 2014/0218473 A1* | 8/2014 | Hannuksela | H04N 19/597 348/43 |

OTHER PUBLICATIONS

Bross et al.(Bross, B. et al. "High Efficiency Video Coding(HEVC) text specification draft 9", 11th Meeting, Joint Collaborative Team on Video Coding(JCT-VC) of ITU-T SG16 WP3 and ISO/IEC JTC1/SC29/WG11, Shanghai, CN, Oct. 10-19, 2012, JCTVC-K1003_v13, pp. 1-317).*

Bross, B. et al. "High Efficiency Video Coding(HEVC) text specification draft 9", 11th Meeting, Joint Collaborative Team on Video Coding(JCT-VC) of ITU-T SG16 WP3 and ISO/IEC JTC1/SC29/WG11, Shanghai, CN, Oct. 10-19, 2012, JCTVC-K1003_v13, pp. 1-317.*

Bross B., et al., "High Efficiency Video Coding (HEVC) text specification draft 10 (for FDIS & Consent)," JCTVC-L1003-v20, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 329 pages.

Chen J., et al., "A proposal for Scalable HEVC Test Model", 102. MPEG Meeting; Oct. 15, 2012-Oct. 19, 2012; Shanghai; (Motion Picture Expert Group or ISO/IEC JTC1/SC29/WG11), No. m27117, Oct. 17, 2012 (Oct. 17, 2012), XP030055428, pp. 1-4.

Chen Y., et al., "Temporal motion vector prediction hook for efficient merge mode in MV-HEVC", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/.jctvc-site/,, No. JCTVC-L0257, Jan. 8, 2013 (Jan. 8, 2013), pp. 1-12; XP030113745.

Dong J., et al., "Description of scalable video coding technology proposal by InterDigital Communications", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/,, No. JCTVC-K0034, Oct. 1, 2012 (Oct. 1, 2012), XP030112966, pp. 1-30.

Hannuksela M.M., et al., "Test Model for Scalable Extensions of High Efficiency Video Coding (HEVC)," 103, MPEG Meeting; Jan. 21, 2013-Jan. 25, 2013; Geneva; (Motion Picture Expert Group or ISO/IEC JTC1/SC29/WG11), No. m28348, Jan. 22, 2013 (Jan. 22, 2013), XP030056894, pp. 1-49.

International Search Report and Written Opinion—PCT/US2014/031578—ISA/EPO—dated May 27, 2014.

Schwarz H., et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 1, 2007 (Sep. 1, 2007 ), pp. 1103-1120, XP011193019, ISSN: 1051-8215, DOI: 10.11 09/TCSVT.2007.905532, pp. 1-18.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Second Written Opinion dated Mar. 13, 2015, from International Application No. PCT/US2014/031578, filed on May 1, 2015, 10 pp.

International Preliminary Report on Patentability from International Application No. PCT/US20141031578, dated Jan. 13, 2015, 18 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

\* cited by examiner

DEVICE AND METHOD FOR SCALABLE CODING OF VIDEO INFORMATION

CROSS-REFERENCE TO RELATED APPLICATIONS

This application claims priority to U.S. Provisional No. 61/805,489, filed Mar. 26, 2013, and U.S. Provisional No. 61/921,989, filed Dec. 30, 2013, which are hereby incorporated by reference in their entireties.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

In inter prediction, a current block in an enhancement layer (EL) picture may be predicted using the motion information of a temporally neighboring picture in the same layer. For example, a temporal motion vector predictor (TMVP) can be derived from a co-located block (e.g., a block corresponding to the same portion of the picture as the current block) in a co-located picture (e.g., temporally neighboring picture in the same layer) and added to the motion vector (MV) candidate list of the current block in the EL. However, in some cases, the MV of the co-located block may not be available as a candidate. For example, the co-located block may be intra-coded. Another indicator for determining the availability of the MV as a candidate is the marking status of the reference picture (e.g., "Reference Picture X") to which the MV associated with the co-located block points. A reference picture can be marked either as a short-term (ST) reference picture or a long-term (LT) reference picture. The marking status of a reference picture may also change over time. The marking status of "Reference Picture X" when the co-located picture was coded (e.g., when the co-located picture was "current") may indicate whether the MV is available as a MV candidate for coding the current block in the EL. For example, if the marking status of "Reference Picture X" when the co-located picture was current and the marking status of the reference picture of the current picture are the same (e.g., both ST or both LT), the MV associated with the co-located block may be available as a MV candidate for the current block.

In scalable video coding (SVC), there could be multiple layers of video information. The layer at the very bottom level may be referred to as a base layer (BL) or reference layer (RL), and the layer at the very top may be referred to as an EL. The term "base layer" as used herein may refer to the bottommost layer or any another reference layer. There may be more than two layers, and the middle layers may serve as a BL or RL for the layers above and serve as an EL for the layers below. In certain cases, a BL picture can be used as the co-located picture from which motion information is derived, as discussed above. In other words, inter prediction of the current block in the EL may be performed using the BL picture (hereinafter, inter-layer reference picture), instead of a temporally neighboring picture in the EL. According to the existing definition of the function LongTermRefPic( ) for outputting the marking status of a reference picture, the function outputs whether the reference picture was marked as "used for long term reference" at the time when the co-located picture was the current picture. However, since an inter-layer reference picture (upsampled BL picture) is newly generated based on a BL picture and thus was not "coded," when an inter-layer reference picture is used as a co-located picture, it is unclear when the inter-layer reference picture was the current picture. A method of determining when the inter-layer reference picture would be considered to be the current picture needs to be defined. Thus, by defining when the inter-layer reference picture would be considered to be the current picture, uniformity in the use of inter-layer reference pictures in inter prediction may be achieved across different coding systems and implementations.

The systems, methods and devices of this disclosure each have several innovative aspects, no single one of which is solely responsible for the desirable attributes disclosed herein.

In one embodiment, an apparatus configured to code (e.g., encode or decode) video information includes a memory unit and a processor in communication with the memory unit. The memory unit is configured to store video information associated with a reference layer and an enhancement layer, the enhancement layer comprising an enhancement layer (EL) picture and the reference layer comprising a reference layer (RL) picture. The processor is configured to generate an inter-layer reference picture (ILRP) by resampling the RL picture; and determine whether, at a predetermined time, a reference picture of the ILRP was a short-term or long-term reference picture with respect to the ILRP.

In one embodiment, a method of coding (e.g., encoding or decoding) video information comprises storing video information associated with a reference layer and an enhancement layer, the enhancement layer comprising an enhancement layer (EL) picture and the reference layer comprising a reference layer (RL) picture; generating an inter-layer reference picture (ILRP) by resampling the RL picture; and determining whether, at a predetermined time, a reference picture of the ILRP was a short-term or long-term reference picture with respect to the ILRP.

In one embodiment, a non-transitory computer readable medium comprises code that, when executed, causes an apparatus to perform a process. The process includes storing video information associated with a reference layer and an enhancement layer, the enhancement layer comprising an enhancement layer (EL) picture and the reference layer comprising a reference layer (RL) picture; generating an inter-layer reference picture (ILRP) by resampling the RL picture; and determining whether, at a predetermined time, a reference picture of the ILRP was a short-term or long-term reference picture with respect to the ILRP.

In one embodiment, a video coding device configured to code video information comprises means for storing video information associated with a reference layer and an enhancement layer, the enhancement layer comprising an enhancement layer (EL) picture and the reference layer comprising a reference layer (RL) picture; means for generating an inter-layer reference picture (ILRP) by resampling the RL picture; and means for determining whether, at a predetermined time, a reference picture of the ILRP was a short-term or long-term reference picture with respect to the ILRP.

DETAILED DESCRIPTION

Figure 1:
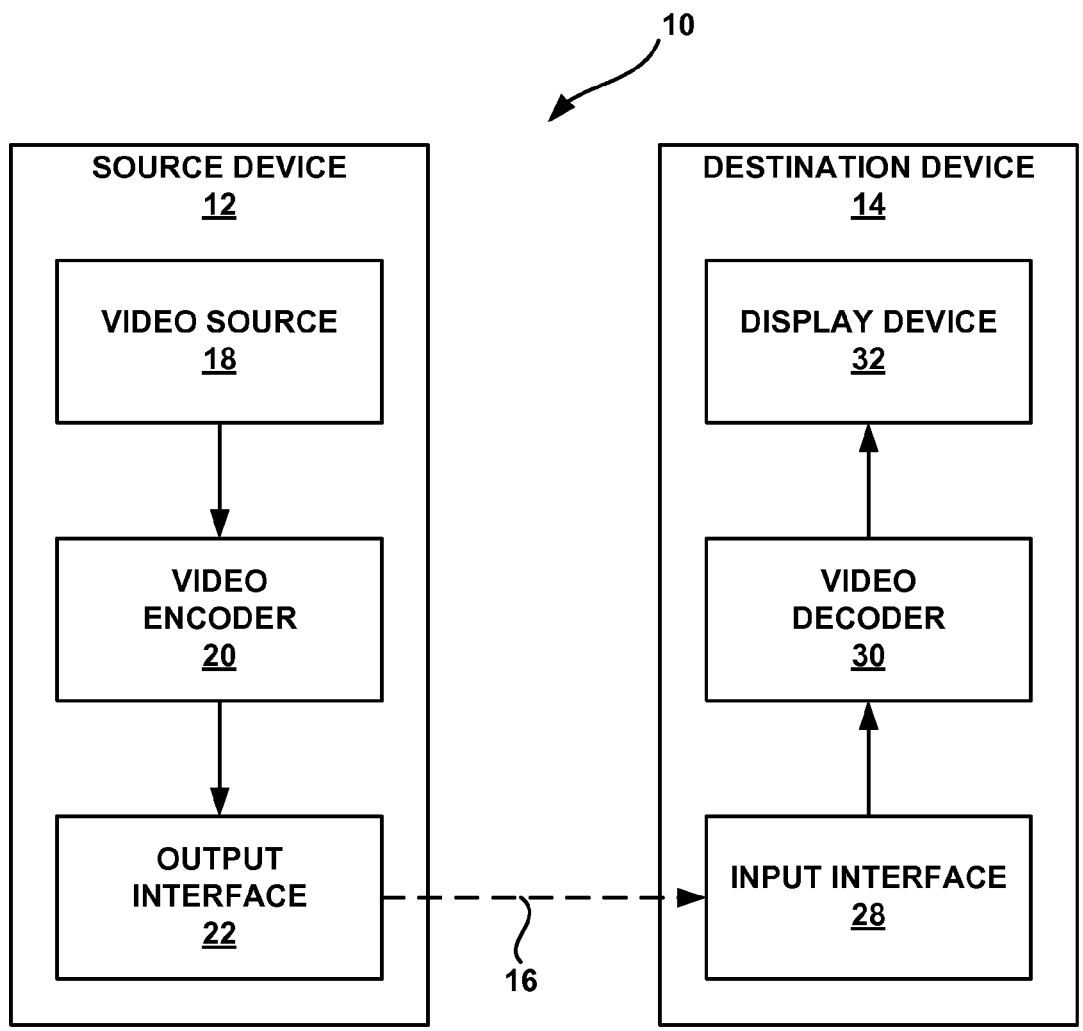
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, pictures, etc.

It is to be recognized that in some embodiments, the features and techniques disclosed herein can be applied to 3DV and MV-HEVC extensions, where the "layer" can be read as a "view". In such embodiments, no upsampling filter may be required.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Although video encoder 20 and video decoder 30 are shown as being implemented in separate devices in the example of FIG. 1, the present disclosure is not limited to such configuration, and video encoder 20 and video decoder 30 may be implemented in the same device. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
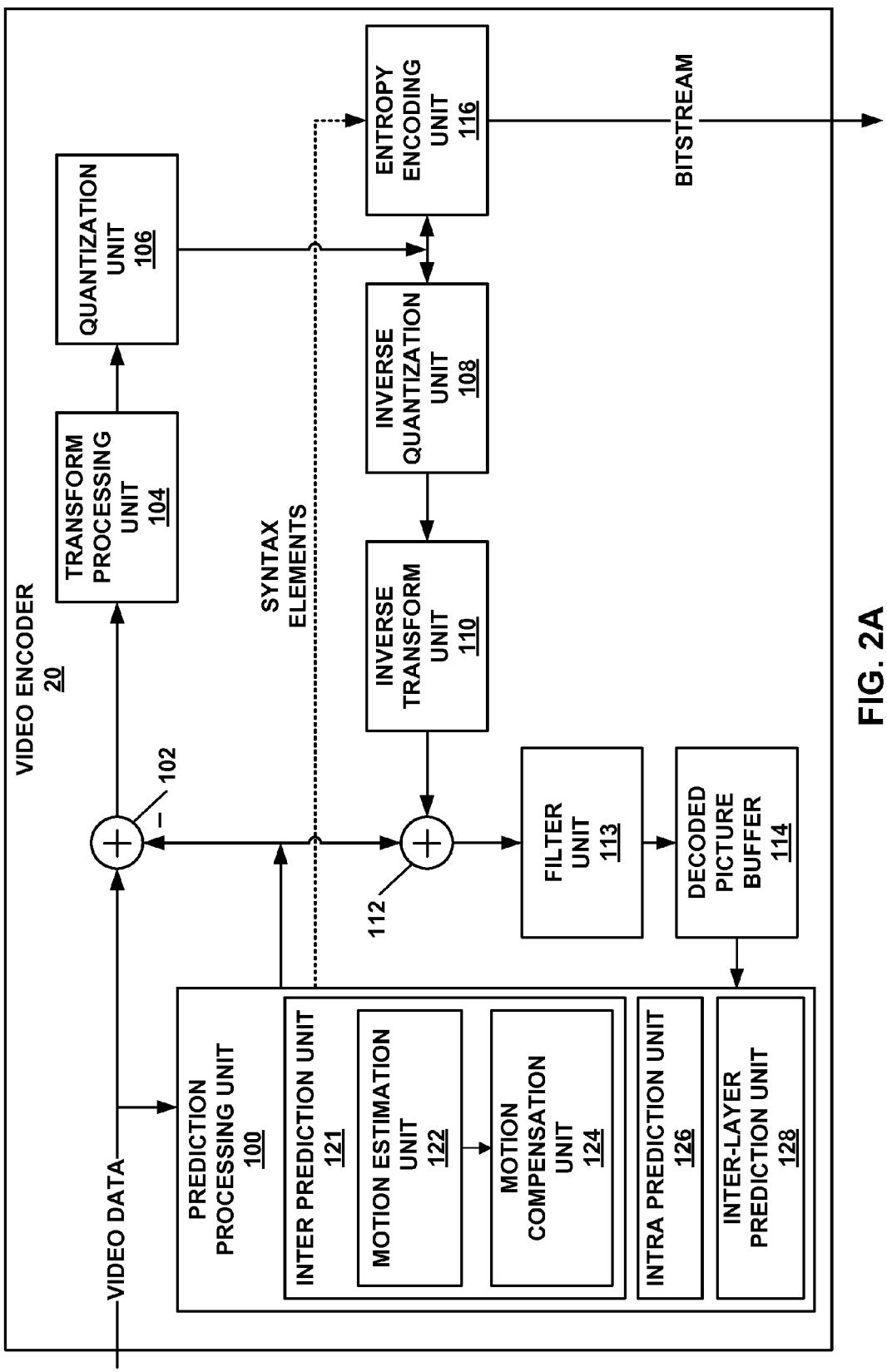
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIG. 5, the prediction processing unit 100 may be configured to code (e.g., encode or decode) the PU (or any other enhancement layer blocks or video units) by performing the method illustrated in FIG. 5. For example, inter prediction unit 121 (e.g., via motion estimation unit 122 and/or motion compensation unit 124), intra prediction unit 126, or inter-layer prediction unit 128 may be configured to perform the method illustrated in FIG. 5, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
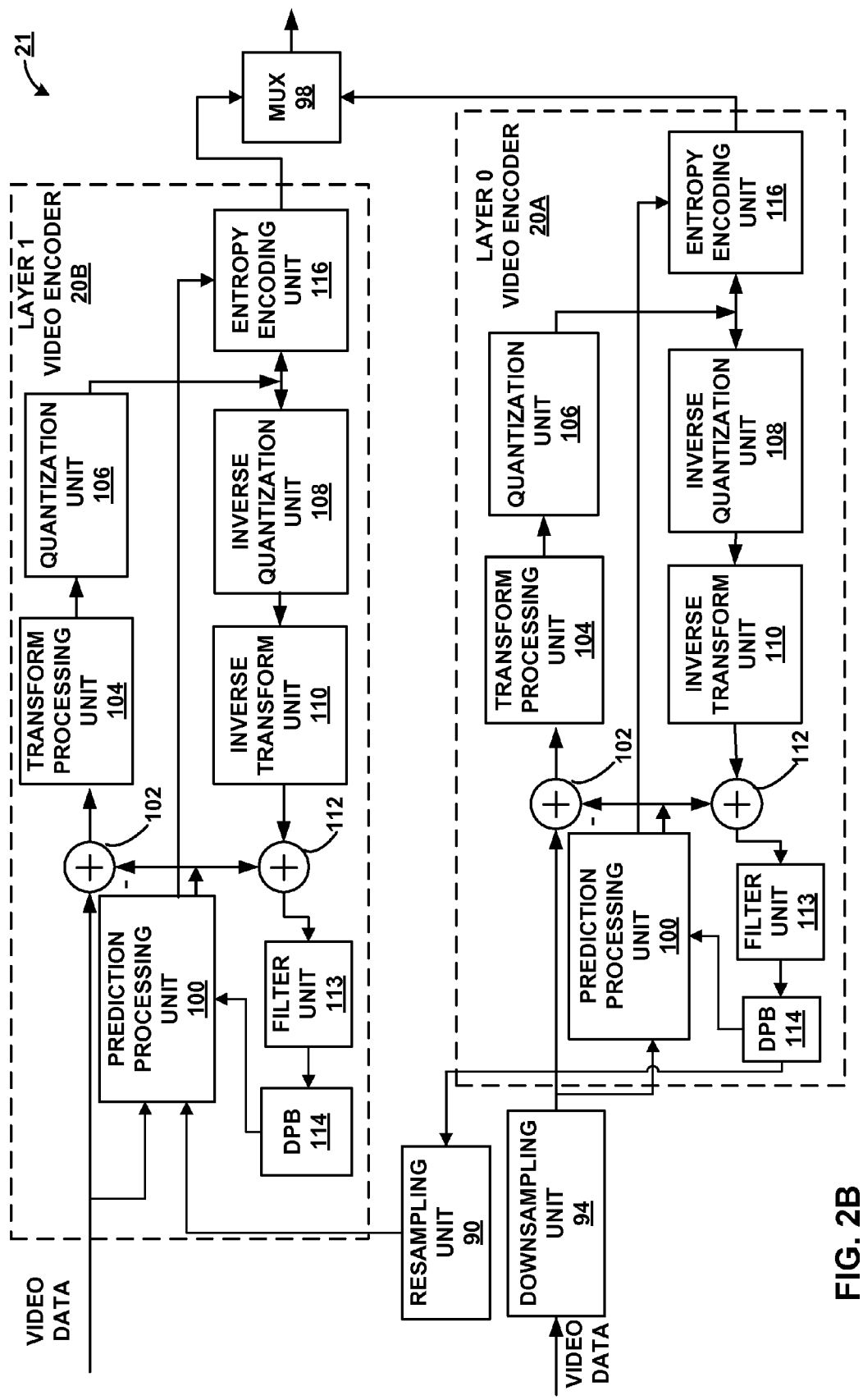
FIG. 2B is a block diagram illustrating another example of a video encoder that may implement techniques in accordance with aspects described in this disclosure.

FIG. 2B is a block diagram illustrating an example of a multi-layer video encoder 21 that may implement techniques in accordance with aspects described in this disclosure. The video encoder 21 may be configured to process multi-layer video frames, such as for SHVC and multiview coding.

Further, the video encoder 21 may be configured to perform any or all of the techniques of this disclosure.

The video encoder 21 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 21 is illustrated as including two video encoders 20A and 20B, the video encoder 21 is not limited as such and may include any number of video encoder 20 layers. In some embodiments, the video encoder 21 may include a video encoder 20 for each picture or frame in an access unit. For example, an access unit that includes five pictures may be processed or encoded by a video encoder that includes five encoder layers. In some embodiments, the video encoder 21 may include more encoder layers than frames in an access unit. In some such cases, some of the video encoder layers may be inactive when processing some access units.

In addition to the video encoders 20A and 20B, the video encoder 21 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 21 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 21 may further include a multiplexer 98, or mux. The mux 98 can output a combined bitstream from the video encoder 21. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 21, such as from a processor on the source device 12. The control signal may be generated based on the resolution or bitrate of a video from the video source 18, based on a bandwidth of the channel 16, based on a subscription associated with a user (e.g., a paid subscription versus a free subscription), or based on any other factor for determining a resolution output desired from the video encoder 21.

Video Decoder

Figure 3A:
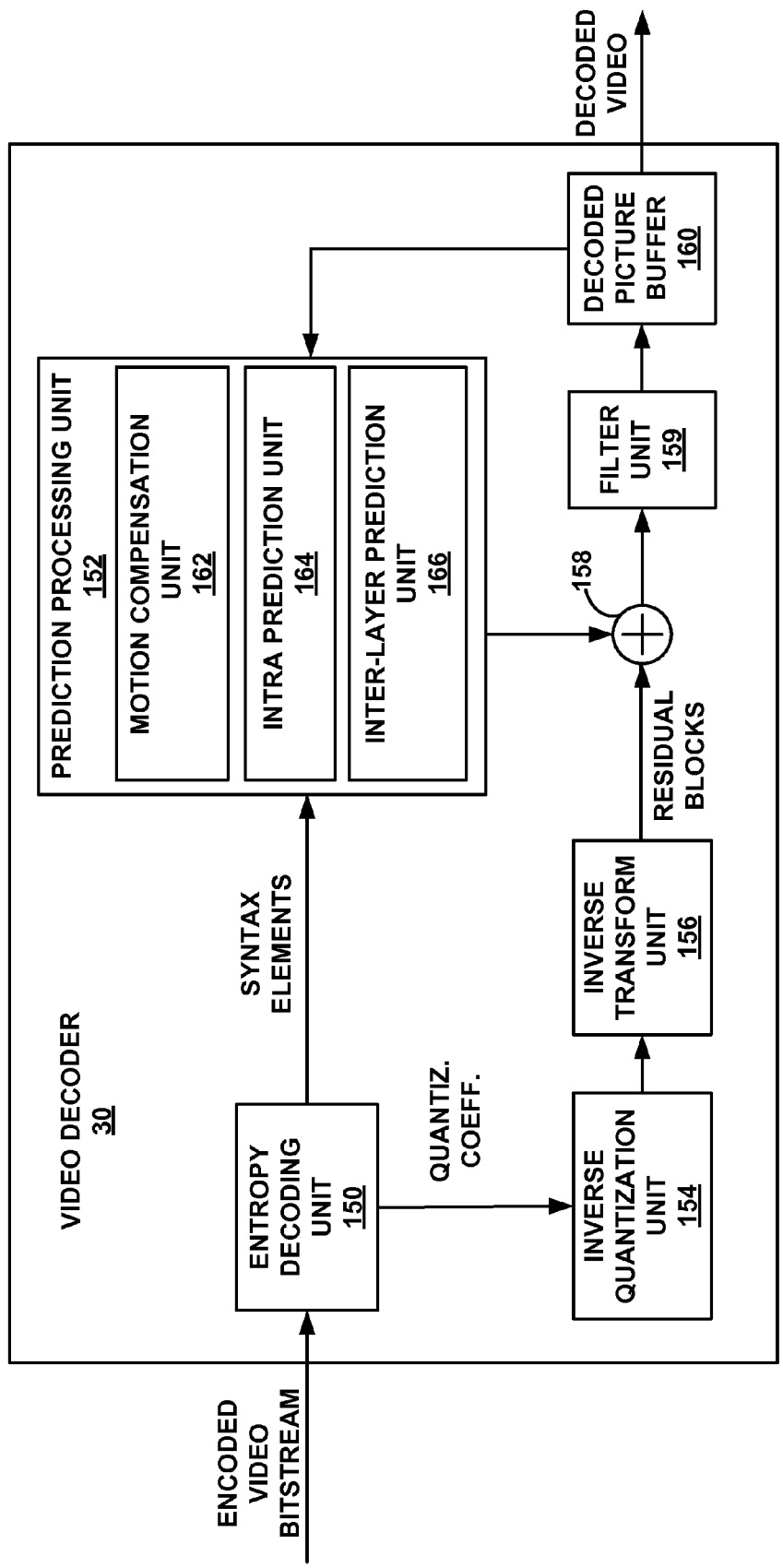
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIG. 5, the prediction processing unit 152 may code (e.g., encode or decode) the PU (or any other enhancement layer blocks or video units) by performing the method illustrated in FIG. 5. For example, motion compensation unit 162, intra prediction unit 164, or inter-layer prediction unit 166 may be configured to perform the method illustrated in FIG. 5, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Multi-Layer Decoder

Figure 3B:
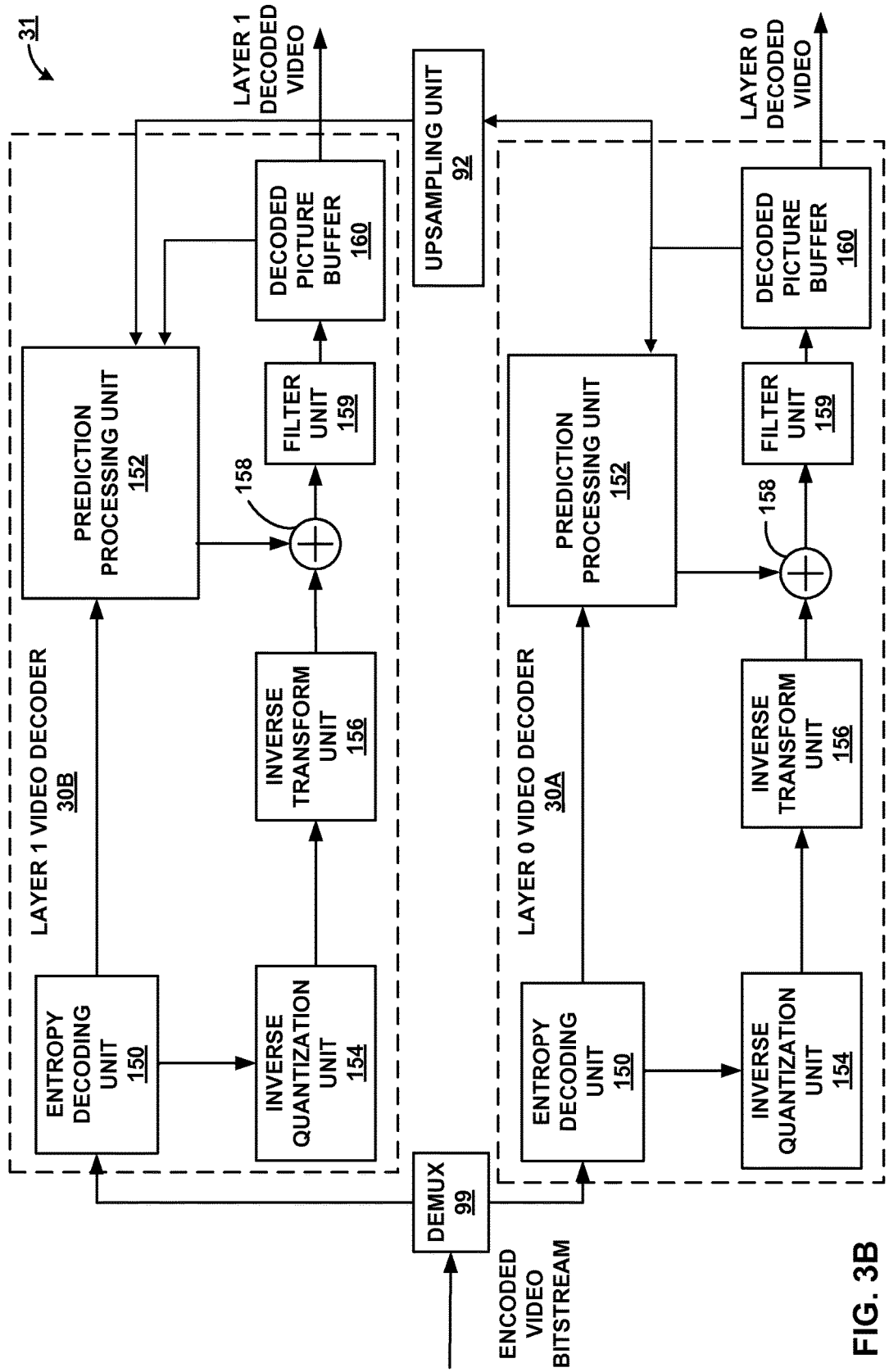
FIG. 3B is a block diagram illustrating another example of a video decoder that may implement techniques in accordance with aspects described in this disclosure.

FIG. 3B is a block diagram illustrating an example of a multi-layer video decoder 31 that may implement techniques in accordance with aspects described in this disclosure. The video decoder 31 may be configured to process multi-layer video frames, such as for SHVC and multiview coding. Further, the video decoder 31 may be configured to perform any or all of the techniques of this disclosure.

The video decoder 31 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 31 is illustrated as including two video decoders 30A and 30B, the video decoder 31 is not limited as such and may include any number of video decoder 30 layers. In some embodiments, the video decoder 31 may include a video decoder 30 for each picture or frame in an access unit. For example, an access unit that includes five pictures may be processed or decoded by a video decoder that includes five decoder layers. In some embodiments, the video decoder 31 may include more decoder layers than frames in an access unit. In some such cases, some of the video decoder layers may be inactive when processing some access units.

In addition to the video decoders 30A and 30B, the video decoder 31 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 31 may further include a demultiplexer 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 31, such as from a processor on the destination device 14. The control signal may be generated based on the resolution or bitrate of a video from the input interface 28, based on a bandwidth of the channel 16, based on a subscription associated with a user (e.g., a paid subscription versus a free subscription), or based on any other factor for determining a resolution obtainable by the video decoder 31.

Temporal Motion Vector Predictor (TMVP)

In inter prediction, a temporal motion vector predictor (TMVP) may be used to improve the coding efficiency. For example, the TMVP may be used as a predictor for the motion vector of the block currently being coded (e.g., current block), and a motion vector difference (MVD) between the motion vector of the current block and the TMVP may be coded instead of coding the entire motion vector of the current block. In some implementations of HEVC, there are two motion vector prediction modes: merge mode and advanced motion vector prediction (AMVP) mode. For example, merge mode refers to one or more video coding modes in which motion information (such as motion vectors, reference frame indices, prediction directions, or other information) for a current block is inherited from a spatially neighboring block in the same picture that contains the current block, or from a co-located block in a different picture (e.g., a temporally neighboring picture in the same layer/view, a picture in another layer, or a picture in another view). The spatially neighboring blocks in the same picture may be referred to as spatial candidate blocks, and the co-located block in a different picture may be referred to as a co-located candidate block. The motion vector derived from a picture that is temporally adjacent to the current picture may be referred to as a temporal motion vector predictor (TMVP). An index value may be used to identify the spatially neighboring block or co-located block from which the current block inherits its motion information (e.g., a top, top right, left, left bottom block, relative to the current block, or a co-located block from a picture that is temporally adjacent to the current picture, a block from another layer, or a block from another view). For example, in merge mode, the reference frame index may be inherited from the co-located candidate block. In another example, the reference frame index of the TMVP may be assumed to be zero. AMVP mode may be similar to merge mode. However, in AMVP mode, the video coder (e.g., encoder or decoder) also codes a reference index into a reference picture list (which is different from the list of candidate motion vector predictors) that identifies the picture used for inter prediction. In other words, in AMVP mode, the video coder may not inherit the reference frame indices, and instead, the reference frame indices may be signaled.

Whether TMVP can be used to predict the current block may be indicated by a flag signaled in the sequence parameter set (SPS) (e.g., sps_temporal_mvp_enable_flag may be set to 1 if the TMVP is enabled for the whole coded video sequence). When the use of a TMVP is enabled for the whole coded video sequence, another flag may be signaled in the slice header to indicate whether the use of a TMVP is enabled for the slice. For example, slice_temporal_mvp_enable_flag may be set to 1 and signaled in the slice header if the use of a TMVP is enabled for the slice.

In deriving a TMVP, the motion vector of a frame in the decoded picture buffer (e.g., in a reference picture list) may be accessed. If the use of a TMVP is enabled for the current slice (e.g., the slice that is currently being encoded or decoded) and the current slice is a B slice, the reference picture list from which the motion vector may be accessed may be signaled by a flag in the slice header. For example, collocated_from_l0_flag may be set to 1 if the picture from which the motion vector may be located is in RefPicList0. If the picture from which the motion vector may be located is in RefPicList1, the flag may be set to 0.

After the reference picture list from which the motion vector may be located has been identified, a reference index signaled in the slice header can be used to identify the picture in the reference picture list. For example, collocated_ref_idx signaled in the slice header may indicate the reference index of the picture in the reference picture list.

After the picture (hereinafter referred to as the co-located picture) from which the TMVP can be derived has been identified, a co-located block (e.g., PU) in the co-located picture may be identified. For example, the co-located block may be the block in the co-located picture that has the same location with respect to the current block in the current picture. In another example, the co-located picture may be the block that represents the same portion of the picture in the co-located picture as the current block in the current picture.

After the co-located block has been identified, the motion vector associated with the co-located block may be identified. For example, the motion vector of the right-bottom adjacent block of the co-located CU may be used. In another example, the motion vector of the center block of the co-located CU may be used. In some cases, the motion vector may not exist (e.g., the co-located block may be intra-coded).

After the motion vector has been identified, whether the motion vector can be added to the motion vector candidate list for predicting the current block may depend on the picture type of the reference picture referred to by the identified motion vector. In addition, whether temporal scaling is to be applied to the motion vector before adding the motion vector to the candidate list may depend on the picture type of the reference picture referred to by the identified motion vector. The relationship between the picture types and the TMVP availability and scaling applicability is further discussed below with reference to Table 1. For example, if it is determined that temporal scaling is to be applied to the motion vector, the scaling factor may be determined based on the temporal distance between the current picture and the target reference picture of the current picture and the temporal distance between the co-located picture and the reference picture of the co-located picture. The target reference picture of the current picture is a reference picture that is to be used for predicting the current block, and the target reference picture may be signaled or pre-defined. For example, the target picture may be the reference picture having a reference index equal to 0. The relationship among the pictures in the current layer according to an example embodiment is further illustrated with reference to FIG. 4.

Figure 4:
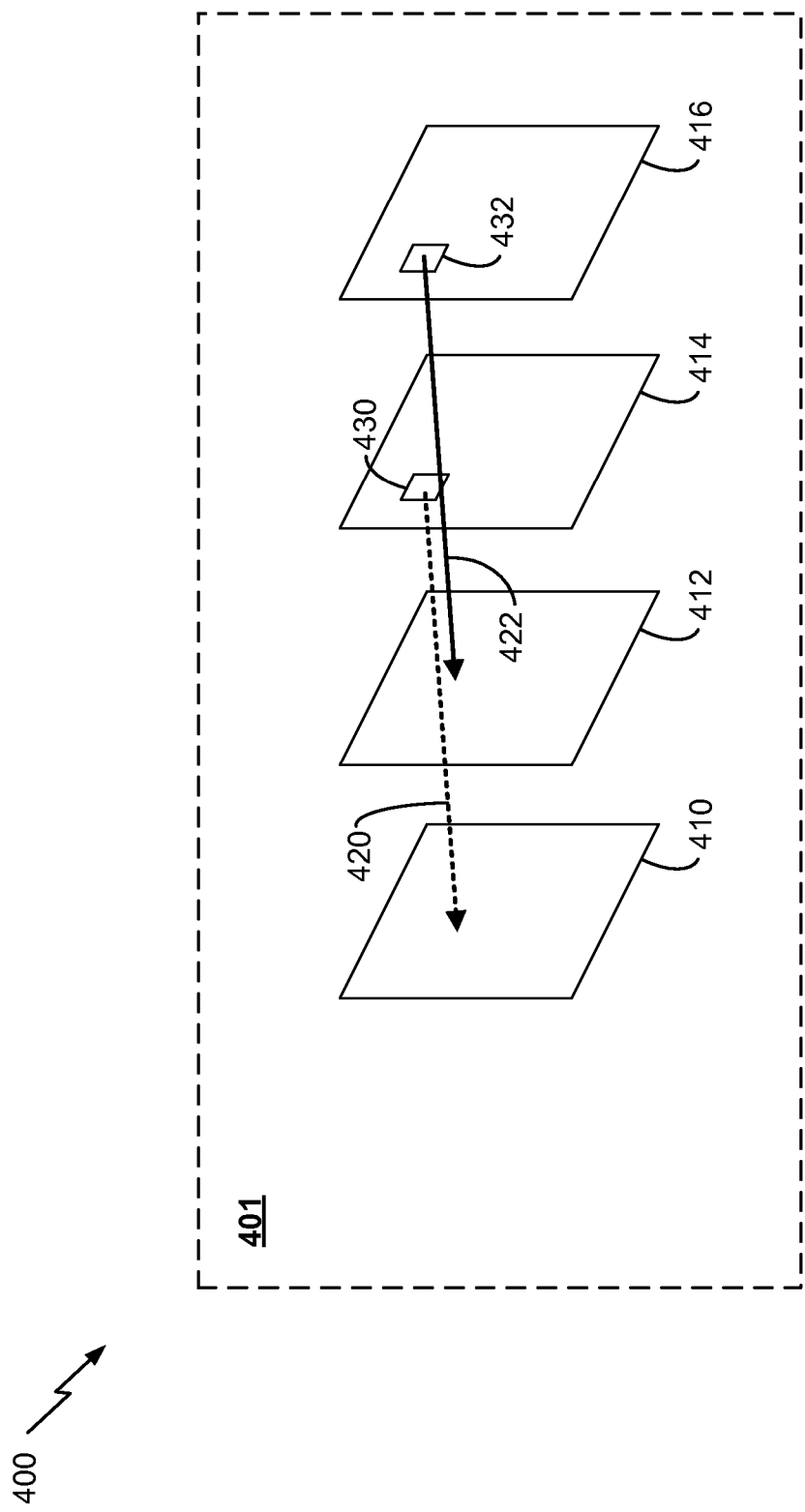
FIG. 4 is a diagram illustrating the various pictures in the enhancement layer.

FIG. 4 shows a diagram 400 illustrating sample pictures in an enhancement layer 401. The enhancement layer 401 includes a target reference picture 410, a reference picture 412 of the co-located picture, a current picture 414, and a co-located picture 416. The current picture 430 includes a current block 430, and the co-located picture 416 includes a co-located block 432. The co-located block 432 is associated with a motion vector 422, which points to the reference picture 412. In the example of FIG. 4, the target reference picture 410 is a picture having a reference index of 0 in the reference picture list of the current block 430. Although the pictures of FIG. 4 are illustrated as being from the enhancement layer 401, one or more of the co-located picture 416, the target reference picture 410, and the reference picture 412 of the co-located picture 416 may be from a layer other than the layer containing the current picture 414. For example, one or more of the co-located picture 416, the target reference picture 410, and the reference picture 412 of the co-located picture 416 may be inter-layer reference pictures.

By scaling (if necessary) the motion vector 422, a motion vector 420 of the current block 430 may be derived. In the example of FIG. 4, the temporal distance between the target reference picture 410 and the current picture 414 is 2, and the temporal distance between the reference picture 412 and the co-located picture 416 is 2. Thus, since the temporal distances are the same, no scaling is performed (e.g., scaled by 1×). Whether scaling is applied to the motion vector may also depend on the picture type of the reference pictures (e.g., the picture types of the target reference picture 410 and the reference picture 412), as further discussed below with reference to Table 1.

TABLE 1

TMVP availability and scaling applicability based on reference picture type

| Reference picture for a target MV | Reference picture for a TMVP | TMVP candidate | Scaling |
|---|---|---|---|
| short-term reference picture | short-term reference picture | "available" | applied |
| short-term reference picture | long-term reference picture | "unavailable" | — |
| long-term reference picture | short-term reference picture | "unavailable" | — |
| long-term reference picture | long-term reference picture | "available" | not applied |

As shown in Table 1, in some embodiments, whether motion vector candidates (e.g., the TMVP and spatial candidates in AMVP mode) are available to be added to the candidate list and whether motion vector scaling is applied may be determined based on whether the target reference frame and co-located or spatial candidate reference frame are of the same type (e.g., short-term or long-term). For example, if the picture types are different, the motion vector candidate (e.g., even if the motion vector exists) is marked as unavailable. How a reference picture can be marked and how such markings may be retrieved are further discussed below.

Marking Status of Reference Pictures

A reference picture in a reference picture list may be marked as a short-term reference picture or a long-term reference picture. For example, all reference pictures may be short-term by default, and a subset of the reference pictures may (when being added to the reference picture list or at a later time) be marked as long-term.

For any reference picture that is put into the reference picture list, there was a moment in time when the reference picture was the current picture (e.g., was currently being encoded or decoded). The picture type of the reference picture (e.g., short-term or long-term) at that moment in time may be recorded so that the picture type can later be retrieved for use in connection with inter prediction. For example, when Picture #1 is being coded, Picture #1 is the current picture. Picture #1 may be coded based on one or more reference pictures. The picture types of such reference pictures may be recorded for later use so that they can be retrieved when Picture #1 is used in inter prediction of another picture. For example, a block of the Picture #1 (e.g., the block that is co-located with respect to the current block) may be used to derive the TMVP, as described above. In another example, Picture #1 may be used to code another picture (e.g., Picture #2). If Picture #2 is now being coded, Picture #2 is the current picture. As discussed above, the picture types of the reference pictures may indicate whether a motion vector candidate should be marked as available or unavailable. If a motion vector candidate is marked as available, the motion vector candidate may be added to the candidate list (e.g., for merge mode or AMVP mode, as further discussed below) for predicting the current block. If the particular motion vector candidate is marked as unavailable, the motion vector candidate (even if it exists) may not be added to the candidate list for predicting the current block. Thus, for coding Picture #2, the picture types of the reference pictures of Picture #1 at the time Picture #1 was current may indicate whether the motion vector(s) in Picture #1 can be scaled and added to a motion vector candidate list of the current block in Picture #2 for predicting the current block.

The picture type of a reference picture may change over time. In the example above, a particular reference picture may be used as a short-term reference of Picture #1. Subsequently, the same reference picture may be marked as a long-term reference picture, and used as a long-term reference picture of Picture #3. Thus, it is important to record the picture type of the reference picture at the time the picture referring to the reference picture was current (e.g., currently being coded).

The picture types of reference pictures may be recorded or stored in a table. For example, the picture types may be stored in the reference picture set (RPS) or the decoded picture buffer (DPB). However, the recording of the picture types (or marking status) is not limited thereto, and any other methods of keeping track of data may be utilized.

In the draft specification of HEVC, a function called LongTermRefPic (nPic, nPb, refIdx, LX), where X is 0 or 1, is defined as follows: if the picture with index refIdx from reference picture list LX of the slice containing the prediction block nPb in the picture nPic was marked as "used for long-term reference" at the time when nPic was the current picture, the function returns 1. Otherwise, the function returns 0. However, as discussed above, the moment in time when nPic was the current picture may not be defined if nPic is a newly generated inter-layer reference picture (e.g., by upsampling a BL picture) that was never "coded." By defining when such an inter-layer reference picture would be considered to be the current picture under the definition of the LongTermRefPic function, the picture type (e.g., marking status) of the inter-layer reference picture may properly be determined using the function for deriving motion vector candidates, and uniformity in the use of inter-layer reference pictures in inter prediction may be achieved across different coding systems and implementations.

Inter-Layer Reference Picture in Inter Prediction

In scalable video coding (SVC), there could be multiple layers of video information. The layer at the very bottom level may be referred to as a base layer (BL), and the layer at the very top may be referred to as an EL. There may be more than one BL and more than one EL. For example, there may be three layers, and the middle layer may serve as a BL for the top layer and serve as an EL for the bottom layer. In another example, a layer having a lower layer ID can be used for predicting another layer having a higher layer ID. For simplicity, the embodiments of the present disclosure are described with reference to two layers, a BL and an EL. However, such embodiments are not limited as such, and the techniques discussed herein may be extended to coding systems having more than two layers.

As discussed above, in inter prediction, a current block in an EL picture may be predicted using the motion information of a temporally neighboring picture in the same layer (e.g., EL). In certain cases, a BL picture can be used as the co-located picture from which motion information is derived. In other words, inter prediction of the current block in the EL may be performed using the BL picture (hereinafter, inter-layer reference picture), instead of a temporally neighboring picture in the EL. For example, in HEVC extensions such as multiview video coding (MVC) or scalable high-efficiency video coding (SHVC), a reference layer (e.g., BL) picture can be used as a reference picture of the current layer. In the case of SHVC, an upsampled version of a BL picture may be added to the reference picture list of the current layer (e.g., EL), and the current picture may be predicted using the upsampled BL picture in the reference picture list, thereby achieving inter-layer prediction. The upsampled version of a BL picture may include both pixel information (e.g., resampled according to the scalability ratio) and non-pixel information, such as motion information (e.g., resampled according to the scalability ratio).

In some SHVC drafts, an inter-layer reference picture used to predict the current block may be a resampled (e.g., upsampled) version of a reference layer picture. For example, the derived inter-layer reference picture can be used as a co-located picture, and the picture type of its reference pictures can be used to determine whether motion vector scaling will be applied. However, since the derived inter-layer reference picture is not a coded picture (e.g., it may have been generated by simply resampling a reference picture), it was never a current picture and cannot be used in conjunction with the existing definition of the function LongTermRefPic( ) Thus, it may be useful to define when the inter-layer reference picture is to be treated as being the current picture for marking purposes to be complaint with the HEVC motion vector scaling process and in view of the high-level syntax (HLS) only concept (e.g., no block-level changes are allowed) of SHVC.

Defining Current Picture Status of Inter-Layer Reference Picture

In one embodiment, an inter-layer reference picture is considered to be the current picture right after the reference layer picture (from which the inter-layer reference picture is generated) is encoded or decoded and the inter-layer reference picture is generated. Alternatively, the inter-layer reference picture may be considered to be the current picture when the reference layer picture was being encoded or decoded. Alternatively, the inter-layer reference picture may be considered to be the current picture (1) when the reference layer picture is the current picture, (2) right before the reference layer picture is encoded or decoded, (3) when the reference layer picture was the current picture, or (4) before being added to the reference picture list of the current picture. The difference between (2) and (4) may be the timing when the marking occurs. For example, according to (2), the marking status of the upsampled reference layer picture to be potentially generated may be recorded when the reference layer picture is being encoded or decoded. On the other hand, according to (4), the marking status of the upsampled reference layer picture (inter-layer reference picture) is recorded when the EL is being encoded or decoded.

In one embodiment, the inter-layer reference picture is no longer considered to be the current picture once the whole access unit has been is encoded or decoded. For example, the inter-layer reference picture may be considered to be the current picture only while the pictures in the same access unit are being encoded or decoded. In one embodiment, after all the pictures in the access unit have been encoded or decoded, the current picture status of the inter-layer reference picture is removed. In one example, an access unit may have N layers, and the inter-layer reference picture is considered to be the current picture while the pictures in the access unit are being encoded or decoded. In another embodiment, the inter-layer reference picture is no longer considered to be the current picture once it is inserted into the reference picture list of the current picture.

In one embodiment, the marking status for every reference picture is set to be the same as that of the reference picture of the reference layer picture (e.g., when the reference layer picture was the current picture). In one embodiment, the marking status is directly copied from that of the reference picture of the reference layer picture. For example, the marking status can be set when the inter-layer reference picture is generated.

Figure 5:
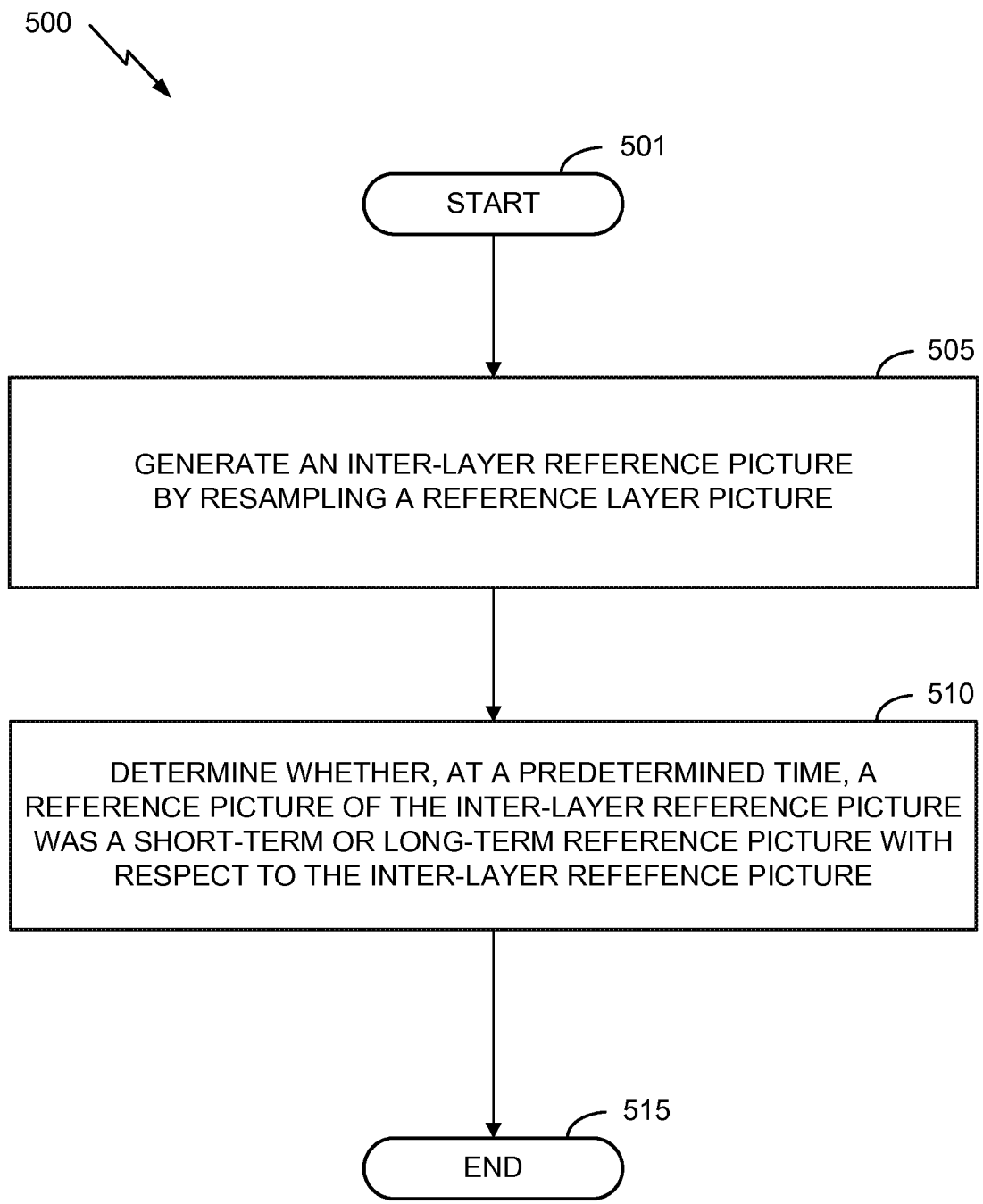
FIG. 5 is a flow chart illustrating a method of coding video information, according to an embodiment of the present disclosure.

FIG. 5 is a flowchart illustrating a method 500 for coding video information, according to an embodiment of the present disclosure. The steps illustrated in FIG. 5 may be performed by an encoder (e.g., the video encoder as shown in FIG. 2A or FIG. 2B), a decoder (e.g., the video decoder as shown in FIG. 3A or FIG. 3B), or any other component. For convenience, method 500 is described as performed by a coder, which may be the encoder, the decoder or another component.

The method 500 begins at block 501. In block 505, the coder generates an inter-layer reference picture by resampling a reference layer (RL) picture. For example, the inter-layer reference picture may be the co-located picture 416 of FIG. 4. The reference layer picture may be an RL picture corresponding to the current picture in the EL. In block 510, the coder determines whether, at a predetermined time, the reference picture of the inter-layer reference picture was a short-term or long-term reference picture with respect to the inter-layer reference picture. In one embodiment, the coder identifies the reference picture of the inter-layer reference picture by determining the motion vector of the co-located block in the inter-layer reference picture, and determining which reference picture the motion vector references. For example, the motion vector may be the motion vector 432 of FIG. 4, and the reference picture may be the reference picture 412 of FIG. 4. In one embodiment, the coder may make the determination by determining whether the reference picture was a long-term reference picture at the time the inter-layer reference picture was generated. In another example, the coder may make the determination by determining whether the reference picture was a long-term reference picture at the time the reference layer picture was decoded. The coder may also use any other method discussed herein. The method 500 ends at block 515.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as generating the inter-layer reference picture, determining the motion vector in the inter-layer reference picture, and determining whether the reference picture pointed to by the motion vector was a long-term reference picture.

In some embodiments, the inter-layer reference picture is a resampled version of a decoded picture of a different layer. In such a case, the encoding or decoding time of the inter-layer reference picture may be assumed to be the same as the encoded or decoded reference layer picture. Alternatively, the inter-layer reference picture may be considered to be the current picture when the EL picture that uses the inter-layer reference picture is the current picture.

In some embodiments, the current status of the inter-layer reference picture is defined independently. For example, the inter-layer reference picture may be set to be the current picture when the inter-layer reference picture is derived (e.g., when the motion resampling is performed). In another embodiment, the inter-layer reference picture may be set to be the current picture when the reference layer picture is encoded or decoded. In another embodiment, the inter-layer reference picture may be set to be the current picture sometime between when the reference layer picture was the current picture and when the EL picture is the current picture. For example, the inter-layer reference picture may be set to be the current picture right after the reference layer picture was the current picture. In another example, the inter-layer reference picture may be set to be the current picture right before the EL picture is (or will be) the current picture.

Derivation of Reference Picture List of Inter-Layer Reference Picture

When an inter-layer reference picture is used to predict the current block, and the TMVP is derived from the inter-layer reference picture, the reference picture referred to by the motion vector (e.g., motion vector 422 of FIG. 4) may need to be identified. To identify the reference picture (e.g., reference picture 412 of FIG. 4), a reference frame index associated with the co-located block in the inter-layer reference picture can be used. However, in order to use the reference frame index to identify the reference picture, a reference picture list is needed, because the reference frame index is an index used to identify a particular item in the reference picture list. Also, the reference picture list may be needed to determine the POC of the reference pictures therein, in order to determine the temporal distances for scaling purposes. Thus, a method of deriving the reference picture list of the inter-layer reference picture is needed.

In one embodiment, the reference picture lists of the inter-layer reference picture are set to be the same as those of the reference layer picture. In this case, a reference picture in a reference picture list of the inter-layer reference picture has the same spatial resolution as that of the enhancement layer picture, although the MVs stored in the inter-layer reference picture might have been scaled from the MVs in the reference layer picture. In another embodiment, a reference picture list of the inter-layer reference picture is set in a way that each entry hypothetically contains an inter-layer reference picture which has the same POC value as the entry in the same position (with the same reference index) of the reference picture list of the reference layer picture. Additionally, regardless of whether the reference picture lists of the inter-layer reference picture contains pictures in the reference layers, the layer_id of each reference picture may be equal to the layer_id of the reference layer.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
    a memory configured to store video data associated with a reference layer that includes a reference layer (RL) picture and associated with an enhancement layer that includes an enhancement layer (EL) picture; and
    a processor in communication with the memory, the processor being configured to:
    resample the RL picture to generate an inter-layer reference picture (ILRP) that is associated with a motion vector pointing to a first reference picture;
    identify a marking status determination function configured to determine whether a given reference picture of a given picture was marked as a short-term reference picture (STRP) or as a long-term reference picture (LTRP) when the given picture was coded;
    determine a time reference to be associated with the ILRP, the time reference representing a time between when the RL picture was coded and when the EL picture was coded, such that the time reference, when used in the marking status determination function, provides a determination of whether the first reference picture was marked as the STRP or as the LTRP with respect to the ILRP;
    apply the marking status determination function to determine whether the first reference picture was marked as the STRP or as the LTRP at a time associated with the time reference based on inputting input values into the marking status determination function, the input values comprising: (i) the ILRP, (ii) a prediction block within a slice of the ILRP, (iii) a reference index corresponding to a position of the first reference picture in a reference picture list associated with the slice of the ILRP, (iv) the reference picture list associated with the slice of the ILRP; and (v) the time reference;
    determine, when the ILRP is used for predicting the EL picture, whether the first reference picture is the STRP or the LTRP based on whether the first reference picture was marked as the STRP or as the LTRP when the RL picture was being coded;
    based on the determination of whether the first reference picture was marked as the STRP or as the LTRP at the time associated with the time reference, determine whether the motion vector of the ILRP is to be scaled; and
    code the enhancement layer using the motion vector and based on the determination of whether the motion vector is to be scaled.

2. The apparatus of claim 1, wherein the marking status determination function is a version of LongTermRefPic( ) defined by the High Efficiency Video Coding (HEVC) standard, the version representing the LongTermRefPic( ) function being modified to provide a determination of whether the first reference picture was marked as an STRP or an LTRP at the time associated with the time reference.

3. The apparatus of claim 1, wherein the time reference to be associated with the ILRP is associated with a time selected from the group consisting of: when the ILRP is generated; when the RL picture is coded; before the RL picture is coded; and before the ILRP is added to a reference picture list of the EL picture.

4. The apparatus of claim 1, wherein the first reference picture is temporally separated from the RL picture.

5. The apparatus of claim 1, wherein the processor is further configured to set a reference picture list of the ILRP to be the same as a reference picture list of the RL picture, the reference picture list of the ILRP comprising reference pictures having a same resolution as the EL picture.

6. The apparatus of claim 1, wherein the processor is further configured to derive a reference picture list of the ILRP including the reference picture, the derivation being from a reference picture list of the RL picture such that each entry in the reference picture list of the ILRP has a same picture order count (POC) value as a corresponding entry in the reference picture list of the RL picture.

7. The apparatus of claim 1, wherein the processor is further configured to derive a reference picture list of the ILRP including the reference picture, the derivation being from a reference picture list of the RL picture such that each reference picture in the reference picture list of the ILRP has a respective layer ID equal to a layer ID of the RL.

8. The apparatus of claim 1, wherein the apparatus comprises an encoder, and wherein the processor is further configured to encode the enhancement layer.

9. The apparatus of claim 1, wherein the apparatus comprises a decoder, and wherein the processor is further configured to decode the enhancement layer.

10. The apparatus of claim 1, wherein the apparatus comprises a device selected from a group consisting of: a computer, a notebook computer, a laptop computer, a tablet computer, a set-top box, a telephone handset, a smart phone, a smart pad, a television, a camera, a display device, a digital media player, a video gaming console, and an in-car computer.

11. A method of coding video information, the method comprising:
    storing video data associated with a reference layer that includes a reference layer (RL) picture and associated with an enhancement layer that includes an enhancement layer (EL) picture;
    resampling the RL picture to generate an inter-layer reference picture (ILRP) that is associated with a motion vector pointing to a first reference picture;
    identifying a marking status determination function configured to determine whether a given reference picture of a given picture was marked as a short-term reference picture (STRP) or as a long-term reference picture (LTRP) when the given picture was coded;

determining a time reference to be associated with the ILRP, the time reference representing a time between when the RL picture was coded and when the EL picture was coded, such that the time reference, when used in the marking status determination function, provides a determination of whether the first reference picture was marked as the STRP or as the LTRP with respect to the ILRP;

applying the marking status determination function to determine whether the first reference picture was marked as the STRP or as the LTRP at a time associated with the time reference based on inputting input values into the marking status determination function, the input values comprising: (i) the ILRP, (ii) a prediction block within a slice of the ILRP, (iii) a reference index corresponding to a position of the first reference picture in a reference picture list associated with the slice of the ILRP, (iv) the reference picture list associated with the slice of the ILRP; and (v) the time reference;

determining, when the ILRP is used for predicting the EL picture, whether the first reference picture is the STRP or the LTRP based on whether the first reference picture was marked as the STRP or as the LTRP when the RL picture was being coded;

based on the determination of whether the first reference picture was marked as the STRP or as the LTRP at the time associated with the time reference, determining whether the motion vector of the ILRP is to be scaled; and coding the enhancement layer using the motion vector and based on the determination of whether the motion vector is to be scaled.

12. The method of claim 11, wherein the marking status determination function is a version of LongTermRefPic( ) function defined by the High Efficiency Video Coding (HEVC) standard, the version representing the LongTermRefPic( ) function being modified to provide a determination of whether the first reference picture was marked as an STRP or an LTRP at the time associated with the time reference.

13. The method of claim 11, wherein the time reference to be associated with the ILRP is associated with a time selected from the group consisting of: when the ILRP is generated; when the RL picture is coded; before the RL picture is coded; and before the ILRP is added to a reference picture list of the EL picture.

14. The method of claim 11, wherein the first reference picture is temporally separated from the RL picture.

15. The method of claim 11, further comprising deriving a reference picture list of the ILRP including the reference picture, the derivation being from a reference picture list of the RL picture such that each entry in the reference picture list of the ILRP has a same picture order count (POC) value as a corresponding entry in the reference picture list of the RL picture.

16. The method of claim 11, further comprising deriving a reference picture list of the ILRP including the reference picture, the derivation being from a reference picture list of the RL picture such that each reference picture in the reference picture list of the ILRP has a respective layer ID equal to a layer ID of the RL.

17. A non-transitory computer readable medium comprising code that, when executed, causes an apparatus to:

store video data associated with a reference layer that includes a reference layer (RL) picture and associated with an enhancement layer that includes an enhancement layer (EL) picture;

resample the RL picture to generate an inter-layer reference picture (ILRP) that is associated with a motion vector pointing to a first reference picture;

identify a marking status determination function configured to determine whether a given reference picture of a given picture was marked as a short-term reference picture (STRP) or as a long-term reference picture (LTRP) when the given picture was coded;

determine a time reference to be associated with the ILRP, the time reference representing a time between when the RL picture was coded and when the EL picture was coded, such that the time reference, when used in the marking status determination function, provides a determination of whether the first reference picture was marked as the STRP or as the LTRP with respect to the ILRP;

apply the marking status determination function to determine whether the first reference picture was marked as the STRP or as the LTRP at a time associated with the time reference based on inputting input values into the marking status determination function, the input values comprising: (i) the ILRP, (ii) a prediction block within a slice of the ILRP, (iii) a reference index corresponding to a position of the first reference picture in a reference picture list associated with the slice of the ILRP, (iv) the reference picture list associated with the slice of the ILRP; and (v) the time reference;

determine, when the ILRP is used for predicting the EL picture, whether the first reference picture is the STRP or the LTRP based on whether the first reference picture was marked as the STRP or as the LTRP when the RL picture was being coded;

based on the determination of whether the first reference picture was marked as the STRP or as the LTRP at the time associated with the time reference, determine whether the motion vector of the ILRP is to be scaled; and code the enhancement layer using the motion vector and based on the determination of whether the motion vector is to be scaled.

18. A video coding device configured to code video information, the video coding device comprising:

means for storing video data associated with a reference layer that includes a reference layer (RL) picture and associated with an enhancement layer that includes an enhancement layer (EL) picture;

means for resampling the RL picture to generate an inter-layer reference picture (ILRP) that is associated with a motion vector pointing to a first reference picture;

means for identifying a marking status determination function configured to determine whether a given reference picture of a given picture was marked as a short-term reference picture (STRP) or as a long-term reference picture (LTRP) when the given picture was coded;

means for determining a time reference to be associated with the ILRP, the time reference representing a time between when the RL picture was coded and when the EL picture was coded, such that the time reference, when used in the marking status determination function, provides a determination of whether the first reference picture was marked as the STRP or as the LTRP with respect to the ILRP;

means for applying the marking status determination function to determine whether the first reference picture was marked as the STRP or as the LTRP at a time associated with the time reference based on inputting input values into the function, the input values comprising: (i) the ILRP, (ii) a prediction block within a slice of the ILRP, (iii) a reference index corresponding to a position of the first reference picture in a reference picture list associated with the slice of the ILRP, (iv) the reference picture list associated with the slice of the ILRP; and (v) the time reference;

means for determining, when the ILRP is used for predicting the EL picture, whether the first reference picture is the STRP or the LTRP based on whether the first reference picture was marked as the STRP or as the LTRP when the RL picture was being coded;

means for determining, based on the determination of whether the first reference picture was marked as the STRP or as the LTRP at the time associated with the time reference, whether the motion vector of the ILRP is to be scaled; and means for coding the enhancement layer based on (i) the motion vector without the scaling or (ii) the motion vector with the scaling.

19. The method of claim 11, the method being executable on a wireless communication device, wherein the device comprises:

a memory configured to store video data;

a processor configured to execute instructions to process the video data stored in said memory;

a transmitter configured to transmit encoded video data comprising the motion vector; and a receiver configured to receive encoded video data comprising the motion vector.

20. The method of claim 19, wherein the wireless communication device is a cellular telephone and the encoded video data is received by the receiver and demodulated according to a cellular communication standard.

21. The apparatus of claim 1, wherein the apparatus is a wireless communication device, further comprising:

a transmitter configured to transmit encoded video data comprising the motion vector; and a receiver configured to receive encoded video data comprising the motion vector.

22. The apparatus of claim 21, wherein the wireless communication device is a cellular telephone and the encoded video data is received by the receiver and demodulated according to a cellular communication standard.

23. The method of claim 11, further comprising setting a reference picture list of the ILRP to be the same as a reference picture list of the RL picture, the reference picture list of the ILRP comprising reference pictures having a same resolution as the EL picture.

* * * * *